United States Patent [19]

Lindberg

[11] Patent Number: 5,439,555
[45] Date of Patent: Aug. 8, 1995

[54] MINIMUM ADVERSE ENVIRONMENTAL PULP WITH FEED TO CHLORATE MANUFACTURE

[75] Inventor: Hans G. Lindberg, Glens Falls, N.Y.

[73] Assignee: Kamyr, Inc., Glens Falls, N.Y.

[21] Appl. No.: 113,644

[22] Filed: Aug. 31, 1993

Related U.S. Application Data

[63] Continuation-in-part of Ser. No. 997,306, Dec. 23, 1992, Pat. No. 5,300,191, which is a continuation-in-part of Ser. No. 922,334, Jul. 30, 1992, Pat. No. 5,374,333.

[51] Int. Cl.$^6$ ............................................. D21C 11/00
[52] U.S. Cl. .................................. 162/30.1; 162/29; 162/DIG. 8; 423/475; 423/478
[58] Field of Search ................ 162/29, 30.1, 30.11, 162/16, DIG. 8; 423/477, 478, 475

[56] References Cited

U.S. PATENT DOCUMENTS 4,799,994  1/1989  Rimpi .................................. 162/29
5,300,191  4/1994  Lindberg ............................. 162/31

FOREIGN PATENT DOCUMENTS 989558   5/1976  Canada .
2041536  11/1991 Canada .

OTHER PUBLICATIONS

Rapson et al. "The Effluent Free Bleached Kraft Pulp Mill . . . ", Tappi, vol. 56, No. 9, Sep. 1973, pp. 112–115.
Bertel Myreen, "Closing Up the Bleach Plant", Jun. 1991, pp. 1–4.
Reeve et al, "The Recovery of Sodium Chloride . . . ", Pulp and Paper Magazine of Canada, vol. 71, No. 13, Jul. 3, 1970, pp. 48–54.

*Primary Examiner*—W. Gary Jones
*Assistant Examiner*—Dean T. Nguyen
*Attorney, Agent, or Firm*—Nixon & Vanderhye

[57] ABSTRACT

Liquid effluent from a pulp mill bleach plant having at least one chlorine chemical bleach stage is evaporated and then used in chlorate manufacture. The bleach plant effluent produced by evaporation may be stored and then transported to an off-site chlorate production location, and/or may be subjected to a sodium chloride removal process (such as evaporative crystallization) and only sodium chloride transported to the off-site location. Chlorates produced off site can be returned to the mill (with acid and caustic that are optionally produced) for chlorine dioxide manufacture on site. The chloride-depleted stream from sodium chloride removal may be burned in the mill recovery boiler.

12 Claims, 2 Drawing Sheets

MINIMUM ADVERSE ENVIRONMENTAL PULP WITH FEED TO CHLORATE MANUFACTURE

CROSS-REFERENCE TO RELATED APPLICATIONS

This application is a continuation-in-part of application Ser. No. 07/997,306 filed Dec. 23, 1992 now U.S. Pat. No. 5,300,191 which in turn is a continuation-in-part of application Ser. No. 07/922,334 filed Jul. 30, 1992 now U.S. Pat. No. 5,374,333.

BACKGROUND AND SUMMARY OF THE INVENTION

In the parent application Ser. No. 07/997,306, a method of producing chlorine dioxide, suitable for use in a minimum adverse environmental impact pulp mill such as shown in grandparent application Ser. No. 07/922,334, from bleach plant effluents is disclosed. According to a primary aspect of that disclosure, chlorine-containing bleach plant effluent is evaporated or otherwise concentrated to a consistency great enough for incineration, and then it is incinerated, and the ash either used directly for chlorine dioxide production right on site, or after storage transportation of the ash to a chlorate manufacturing location off-site where chlorates are produced for eventual return to the pulp mill. According to the present invention, a method of acting on bleach plant effluents to produce chlorates, and ultimately typically chlorine dioxide, is provided that provides a number of important modifications of the general concept disclosed in the parent application, to provide enhanced versatility to the pulp mill while providing minimum adverse environmental impact.

According to the present invention, automatically and sequentially liquid effluents containing chlorides from a bleach plant are concentrated to a solids concentration level high enough for sodium chloride removal or for economic transport to a site off the mill premises. For example, concentration to a solids consistency of about 25-35% (e.g. 33%) is preferred. Then at least a portion of the concentrated liquid effluents is transported to a site off the mill premises, and at a chlorate production location off the mill site chlorate is produced from the transported material. Chlorates are then transported from the chlorate production location to the mill, or otherwise utilized.

The method according to the present invention may comprise the further step, between the concentrating and transporting steps, of storing the concentrated liquid effluents, and/or treating the concentrated liquid effluents to remove sodium chloride (e.g. by evaporative crystallization), so that only NaCl is transported to the chlorate production site. In the latter case, the concentrating step—preferably practiced by evaporation, e.g. using falling film metal-plastic laminate evaporator elements, each laminate having a thickness of about 100 microns or less—is practiced to produce a liquid stream having a high enough solids consistency to be combusted in the mill recovery boiler, and after sodium chloride removal, the chloride-depleted stream is fed to the recovery boiler to be burned therein.

The chlorates returned from the off-site production location are typically used to manufacture chlorine dioxide used in the bleach plant (to bleach the pulp) directly on the plant site. The chlorate production location also optionally produces acid and caustic, which also may be transported to the mill and used therein.

It is the primary object of the present invention to provide an effective, versatile method of handling bleach plant effluents so as to provide minimum adverse environmental impact, typically for the production of chlorine dioxide therefrom. This and other objects of the invention will become clear from an inspection of the detailed description of the invention, and from the appended claims.

DETAILED DESCRIPTION OF THE DRAWINGS

Figure 1:
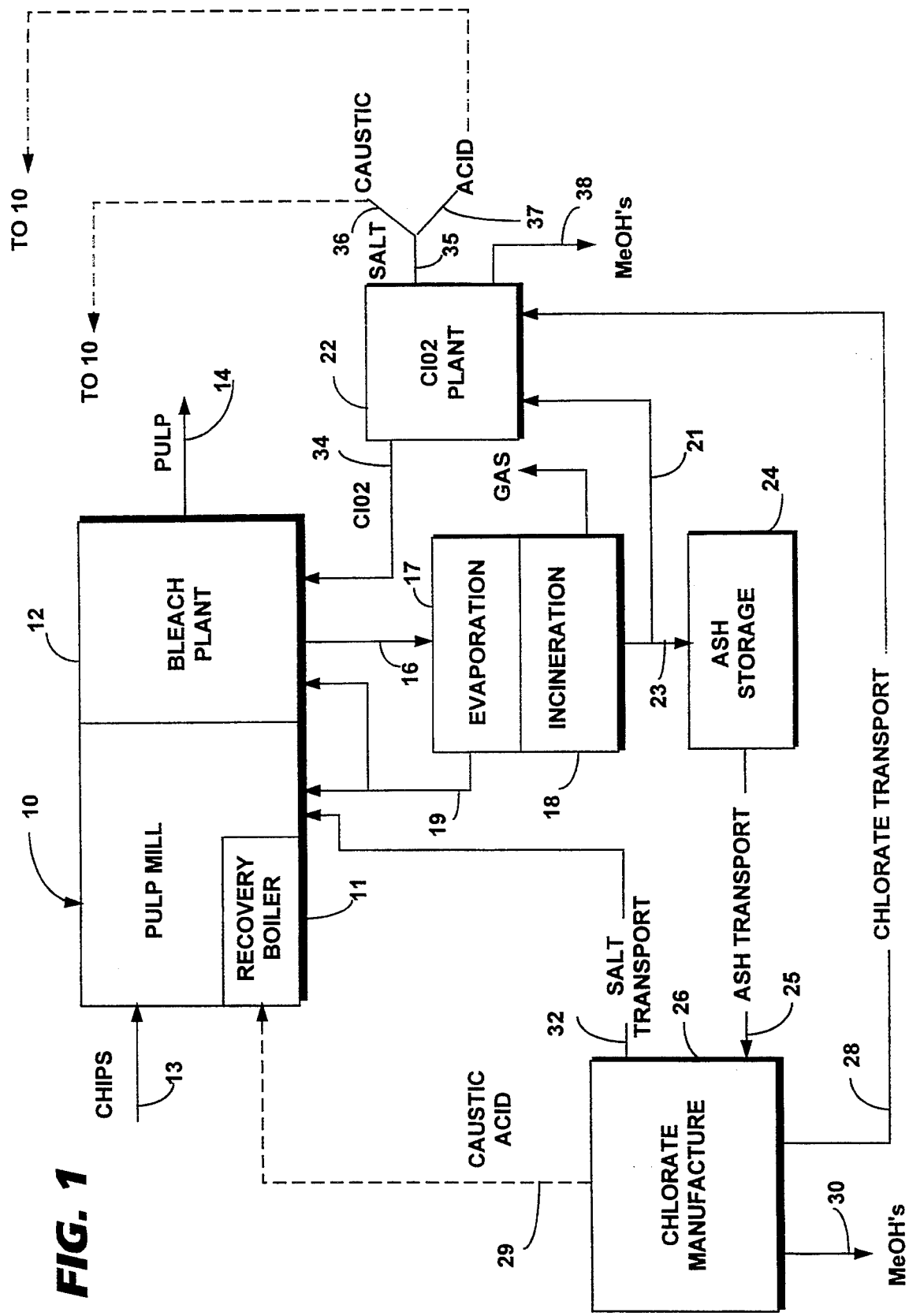
FIG. 1 is a flow chart showing exemplary apparatus utilized in the practice of the method of the parent application.

FIG. 1 schematically illustrates a pulp mill 10, preferably a zero discharge mill such as shown in the parent application, which includes a chemical recovery loop including a recovery boiler 11, and also includes a bleach plant 12. Chips or other cellulosic fibrous material in comminuted form is introduced at 13 to the mill 10, while pulp produced exits at 14.

Liquid effluents are continuously produced by the bleach plant 12, and pass in—line 16 to a concentration apparatus 17. The concentration apparatus 17 preferably comprises evaporators, such as the metal/plastic laminate evaporators described in the parent application, with the concentrated effluents passing to the incineration stage 18. The gaseous components that are evaporated in apparatus 17 pass—as indicated by line 19 in FIG. 1—back to the pulp mill 10, including the bleach plant 12 thereof.

The incineration in stage 18 produces off gases which are properly treated, and ash. In the preferred embodiment according to the invention at least a pan of the ash continuously passes in line 21 directly (that is not through a leach plant, crystal washing, or the like) to a chlorine dioxide production plant 22. Also, at least a portion of the ash continuously passes in line 23 to ash storage facility 24, and from the ash storage facility 24 in line 25 to chlorate manufacturing stage 26.

In the stage 26 the ash is chemically reacted to produce chlorate. This is preferably accomplished by purifying the sodium chloride in the ash and then reacting it according to the following reaction: $NaCl + O_2 + energy \rightarrow NaClO_3$. The sulfates, $Na_2SO_4$, removed from the ash can be used to produce acid or acid and caustic (see line 29), which is used elsewhere: in the mill 10. Heavy metal hydroxides (MeOHS) are also generated and sent to disposal (see line 30). The chlorate produced in stage 26 continuously passes in line 28 to the chlorine dioxide plant 22, where it is used to make chlorine dioxide. Effluents are also minimized from the pulp mill 10, at least in part by feeding salts from the chlorate manufacture stage 26—as indicated by line 32 —back to mill 10.

The chlorine dioxide produced in plant 22 is continuously fed via line 34 to the bleach plant 12, where it is used to bleach pulp. The system illustrated in FIG. 1 preferably can produce all of the chlorine dioxide needs of the bleach plant 12 on site, without any purchase of additional chlorine dioxide being necessary.

While it is desirable to produce all of the ClO₂ on site, instead the ash storage 24 and chlorate manufacturing facility 26 may be off site. That is, the ash may be transported (e.g. trucked) from the mill 10 to the plant 26, and the chlorate, acid and caustic transported back.

The chlorine dioxide production plant 22 also produces salt 35, which can be —used to continuously produce caustic (line 36) and acid (line 37) which are ultimately used elsewhere in the pulp mill 10, e.g. to treat pulp or make pulp treating fluids. The heavy metal hydroxides produced in line 38 are typically disposed Of, although subsequently developed technology may allow for the utilization thereof.

Figure 2:
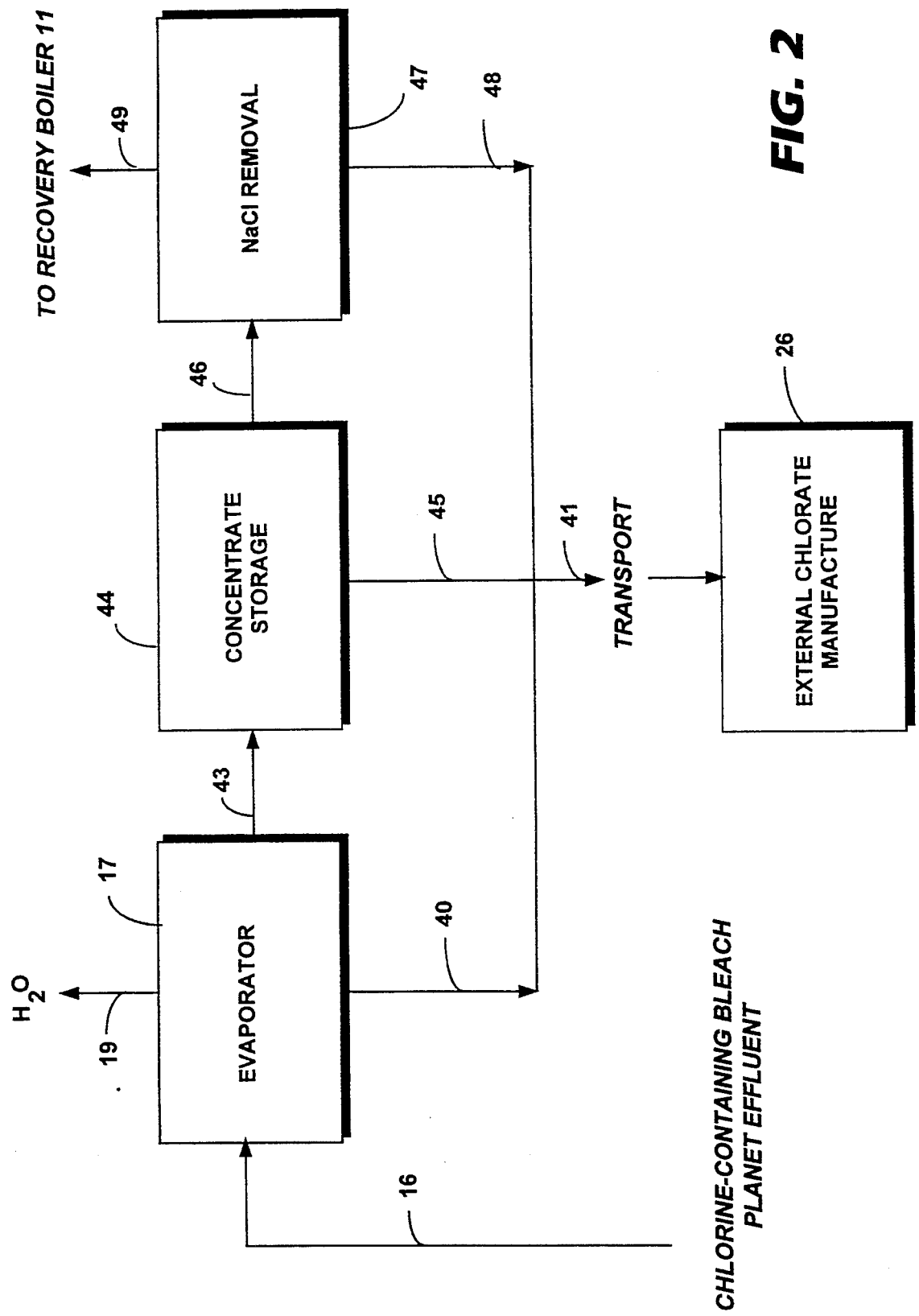
FIG. 2 is a flow chart showing exemplary apparatus utilized in the practice of the modification of method according to the present application.

According to the flow chart illustrated in FIG. 2 a modification of the method of FIG. 1 is provided. In the FIG. 2 embodiment, components comparable to those in the FIG. 1 embodiment are shown by the same reference numeral.

FIG. 2 shows three different alternatives, which may be used in conjunction with each other if desired. The chlorine containing bleach plant effluent liquid in line 16 is fed to the evaporators 17 (e.g. a plurality of falling film evaporators, constructed from metal-plastic laminates having a maximum thickness of about 100 microns), with the water returned to the rest of the system via line 19. According to the leftmost embodiment in FIG. 2, the concentrated liquid effluent (concentrated to a solids consistency high enough for economic transport) is led in line 40 to a transport location, and then transported—as schematically illustrated at 41 in FIG. 2—to a chlorate production location 26 off the pulp mill site. Chlorates produced at the location 26 (and also including acid, caustic, etc.) are preferably ultimately transported back to the, mill site, as shown associated with the facility 26 in FIG. 1, and used to make chlorine dioxide at the mill.

Instead of, or in addition to, feeding concentrated liquid effluents in the line 40, effluents may pass in the line 43 to concentrate storage as indicated schematically at 44 in FIG. 2. For example, the liquid effluents may be concentrated to a solids consistency of about 25-35% (e.g. 33%), and stored at that consistency in 44. When appropriate, concentrated effluent from 44 is led via line 45 to transport at 41.

Instead of, or in addition to, feeding concentrated liquid effluent to storage 44, the concentrated effluents may be fed in lines 43, 46 to sodium chloride removal location 47. At location 47, by any suitable technique, such as evaporative crystallization, the NaCl may be removed and transported via line 48 to transport location 41. In fact, the only component of the concentrated liquid effluent transported to location 26 may be the sodium chloride removed at 47. As a result of NaCl removal, a chloride-depleted stream in line 49 is produced, which preferably is led to the recovery boiler 11 (see FIG. 1) to be burned therein, the solids consistency of the stream in line 49 being high enough to be combusted in the boiler 11 either with, or without, further concentration.

It will thus be seen that according to the present invention a method has been provided which makes effective use of chlorine-containing pulp mill bleach plant effluents, so that the effluents are not discharged into the environment, thus avoiding the possible adverse environmental effects associated with such a discharge. The invention provides great versatility to the pulp mill in handling the effluents most effectively.

While the invention has been herein shown and described in what is presently conceived to be the most practical and preferred embodiment, it will be apparent to those of ordinary skill in the art that many modifications may be made thereof within the scope of the invention, which scope is to be accorded the broadest interpretation of the appended claims so as to encompass all equivalent methods and procedures.

What is claimed is:

1. A method of handling chloride containing liquid streams from a cellulose pulp mill having a bleach plant including at least one chlorine containing stage, and a recovery boiler, comprising the steps of automatically and sequentially:

(a) concentrating liquid effluents containing chlorides from the bleach plant to produce a liquid stream having a higher solids consistency;

(b) treating the concentrated liquid stream from step (a) to remove substantially all sodium chloride therefrom to produce a sodium chloride containing stream and a chloride-depleted stream;

(c) transporting the sodium chloride containing stream to a chlorate production site off the mill premises;

(d) at the chlorate production location off the mill site, producing chlorates from the sodium chloride containing stream from step; and (e) transporting the chloride-depleted stream, with sufficient solids consistency to be combusted in the recovery boiler, to the recovery boiler for burning therein.

2. A method as recited in claim 1 comprising the further step of transporting the chlorates produced in step (d) back to the pulp mill:

3. A method as recited in claim 2 comprising the further step of using the chlorates produced in step (d) in the production of chlorine dioxide at the pulp mill, and using the chlorine dioxide for bleaching pulp at the pulp mill.

4. A method as recited in claim 2 wherein step (d) is also practiced to produce acid and caustic; and comprising the further step of transporting the acid and caustic back to the pulp mill.

5. A method as recited in claim 1 comprising the further step of staring the concentrated liquid effluents, between the practice of steps (a) and (b).

6. A method as recited in claim 1 wherein step (b) is practiced by evaporative crystallization.

7. A method as recited in claim I wherein step (a) is practiced by evaporation.

8. A method as recited in claim 7 wherein step (a) is practiced to concentrate the liquid effluents to a concentration level of about 25-35%.

9. A method as recited in claim 1 wherein step (a) is practiced to cóncentrate the liquid effluents to a concentration level of about 25-35%.

10. A method as recited in claim 1 wherein step (d) is also practiced to produce acid and caustic; and comprising the further step of transporting the acid and caustic back to the pulp mill.

11. A method as recited in claim 10 comprising the further step of using the chlorates produced in step (c) in the production of chlorine dioxide at the pulp mill, and using the chlorine dioxide for bleaching pulp at the pulp mill.

12. A method as recited in claim 1 wherein step (a) is practiced to concentrate the liquid effluents so that the liquid stream has sufficient solids consistency to be combusted in the recovery boiler.

* * * * *